United States Patent

[11] 3,623,963

[72] Inventors  Peter Voss
 Leverkusen-Wiesdorf;
 Hans Niederprum, Monheim, both of
 Germany
[21] Appl. No. 17,303
[22] Filed Mar. 6, 1970
[45] Patented Nov. 30, 1971
[73] Assignee Farbenfabriken Bayer Aktiengesellschaft
 Leverkusen, Germany
[32] Priority Mar. 13, 1969
[33] Germany
[31] P 19 12 738.9

[54] PROCESS FOR THE MANUFACTURE OF PERFLUORALKYLSULPHONYL FLUORIDES
 1 Claim, No Drawings
[52] U.S. Cl. .................................................. 204/59
[51] Int. Cl. .................................................. B01k 3/00

[50] Field of Search ........................................... 204/62, 59

[56] References Cited
 UNITED STATES PATENTS
 2,732,398  1/1956  Brice et al. ..................... 204/59 X
 3,274,081  9/1966  Pearlson ........................ 204/59
 3,423,299  1/1969  Loree ............................ 204/59

Primary Examiner—John H. Mack
Assistant Examiner—D. R. Valentine
Attorney—Plumley & Tyner ABSTRACT: Process for manufacturing perfluoralkyl-sulphonyl fluorides which consists in electrolyzing cyclic unsaturated sulphones of the formula

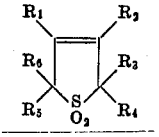

in which $R_1$, $R_2$, $R_3$, $R_4$, $R_5$ and $R_6$ independently of one another denote hydrogen or a $C_1$–$C_6$-alkyl group, in hydrofluoric acid.

PROCESS FOR THE MANUFACTURE OF PERFLUORALKYLSULPHONYL FLUORIDES

PROCESS FOR THE MANUFACTURE OF PERFLUORALKYLSULPHONYL FLUORIDES

The present invention relates to a process for the manufacture of perfluoralkylsulphonyl fluorides; more particularly it concerns a process for the manufacture of perfluoralkylsulphonyl fluorides wherein cyclic unsaturated sulphones of general formula

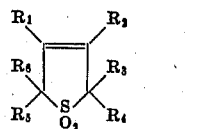

in which $R_1$, $R_2$, $R_3$, $R_4$, $R_5$ and $R_6$ independently of one another denote hydrogen or a $C_1$—$C_6$-alkyl group, are electrolyzed in anhydrous hydrofluoric acid.

The perfluoralkylsulphonyl fluorides manufactured according to the invention possess considerable technical importance for the manufacture of surface-active substances and especially of water-repellant and oil-repellant agents for finishing textiles and other materials.

Electrochemical fluorination processes for the manufacture of perfluoralkylsulphonyl fluorides are already known. Thus, for example, according to the British Pat. No. 758,467, saturated alkanesulphonic acid halides, and according to the British Pat. No. 1,099,240 (=U.S. Pat. No. 3,423,299), saturated cyclic sulphones, are subjected to electrochemical fluorination in anhydrous hydrofluoric acid. The process according to the invention is distinguished from these two processes in that it starts from significantly cheaper starting products—the addition products of $SO_2$ to $\alpha,\omega$-diolefines are employed directly—and that it consumes less current, which follows from the equations below:

$$C_4H_9SO_2cl + 10HF + 19\text{Farad} \longrightarrow C_4F_9SO_2F + \tfrac{1}{2}Cl_2 + 9.5H_2$$

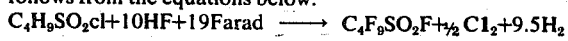

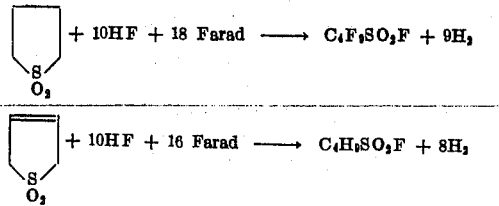

The reduced current consumption at the same time reduces the colling costs of the process, which are known to be of considerable importance in electrochemical fluorination. Furthermore less electrolysis gas (hydrogen) is produced in the process according to the invention, as a result of which less hydrofluoric acid, which has to be recovered by cooling, evaporates. Furthermore the evolution of chlorine or hydrogen chloride, as occurs in the fluorination of the sulphonyl chlorides, which consumes additional current and is undesirable because of the corrosive properties of the gases, is avoided.

Since it was known from the literature [compare M. Sander, W. Blochl, Chemie-Ing.-Technik 37 (1965), page 8] that olefinic compounds and even aromatic compounds tend to polymerize in anhydrous hydrofluoric acid and lead to resinification of the electrodes, it was surprising that the electrochemical fluorination of the unsaturated cyclic sulphones to be used according to the invention, in anhydrous hydrofluoric acid, furnish perfluorosulphonyl fluorides in good yields even in highly concentrated solutions, for example 20 percent strength solutions.

As unsaturated cyclic sulphones to be used in the process according to the invention there may for example be quoted:

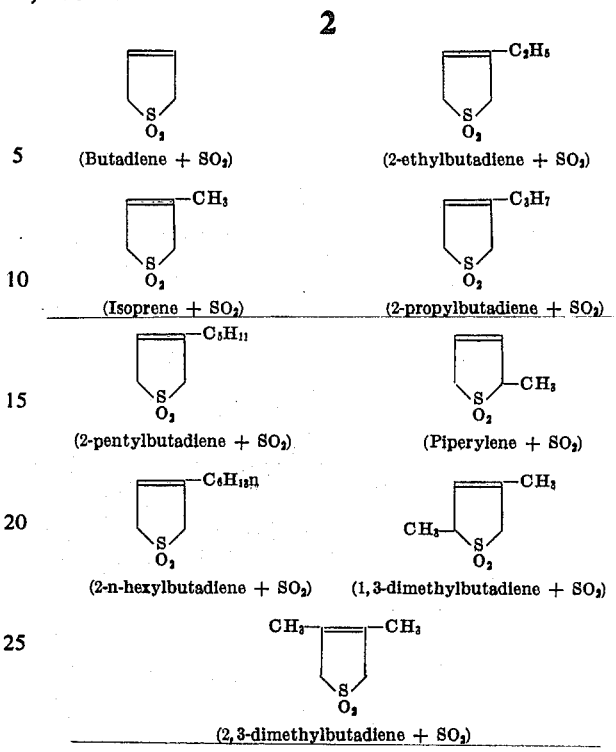

The sulphones to be used are in general easily soluble in anhydrous hydrofluoric acid and yield conductive solutions; it is not necessary to add a salt which confers conductivity.

The electrochemical cell is best manufactured from a noncorroding metal such as nickel, Monel metal, gold-plated metal or molybdenum. It can also consist of graphite or be lined with fluorocarbon plastics.

The cathodes and anodes can be manufactured from nickel, Monel metal, carbon or silicon carbide.

An electrolysis cell of nickel equipped with a packet of nickel anode and cathode plates spaced at 3 mm. has proved to be most suitable. Suitable operating conditions have proved to be a voltage of about 4.5–6 v., a current density of about 0.5 a./dm.$^2$ and a concentration of unsaturated cyclic sulphones in the hydrofluoric acid of 5–20 percent by weight relative to the weight of the anhydrous hydrofluoric acid.

The process according to the invention is in general carried out at a low temperature, generally below 10° C., preferably 0°–5° C.

An operating period of several hours or days is generally required in order to increase the yield of the process according to the invention to a maximum.

EXAMPLE 1

The electrolysis cell holds 9.6 l. in the ready-to-operate condition. The electrode packet consists of 31 nickel plates (16 cathodes and 15 anodes) of which the effective anode surface amounts to 10,460 cm.$^2$ corresponding, at a load of 50 amp., to a current density of 0.005 a./cm.$^2$ The cell was charged with 2,000 g. of butadienesulphone and about 8 lg. of anhydrous hydrofluoric acid. The average electrolysis temperature was 0° C. Hydrofluoric acid and butadienesulphone were discontinuously added as required during the electrolysis, which lasted 740 hours. The starting product dissolved very well in the hydrofluoric acid. The addition of an electrolyte was not necessary. The average current strength was 42.9 amp. The voltage fluctuated between 4.7 and 6 volts. In total, 6,500 g. of butadienesulphone were employed. 8,694 g. of a reaction product were run off at the bottom of the cell and according to analysis by gaschromatography consisted to the extent of 86.90 percent of perfluorobutanesulphonyl fluoride. The boiling point of the purified $C_4F_9SOF$ lay between 64°–65° C. The yield of substance was 45.0 percent. The current yield was 33.7 percent.

EXAMPLE 2

2,000 g. of the crude 2-methylsulpholene prepared by heating sulfur dioxide and peroxide free 1,3-pentadiene in a molar ratio of 2,94:1 and in the presence of catalytic amounts of hydroquinone in a sealed vessel to 95° C. for 3 hours, were electrolyzed in the 9.61 cell described in example 1. It was not necessary to add an electrolyte. The temperature of the electrolysis cell fluctuated between −2 and +3° C. The temperature of the condenser was −60° C. During the electrolysis which lasted 351 hours a total of 5,825 g. of crude 2-methylsulpholene was employed. The voltage fluctuated between 4.7 and 5.8 v., the average voltage was 5.14 v., and the average current strength was 45.7 a. A total of 4,941 g. of product was run off at the bottom of the cell.

As expected, two isomeric forms of perfluoropentanesulphonyl fluoride were produced on electrochemical fluorination of 2-methylsulpholene by splitting of the C—S bond:

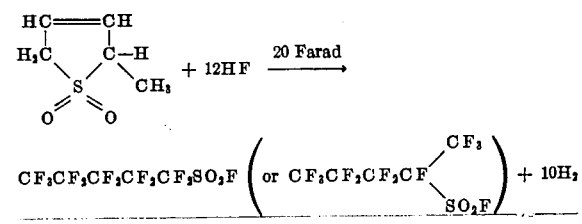

89.1 percent of the crude product produced consisted of perfluorinated sulphonyl fluoride, corresponding to a yield of substance of 33.5 percent and a current yield of 38.4 percent.

EXAMPLE 3

2,000 g. of 3-methylsulpholene were dissolved in 81 g. of anhydrous hydrofluoric acid and electrolyzed without the addition of a salt to confer conductivity. After 6 days a further 695 g. of the starting product were added. After 273 hours and an average current strength of 54.4 amp. the total yield was 3,320 g. During the experiment the voltage increased, at constant current strength, from 4.6 to 5.9 volts. The average electrolysis temperature was −2 ° C. The resulting crude product consisted, to the extent of 64.9 percent of a perfluoroalkylsulphonic acid fluoride isomer mixture:

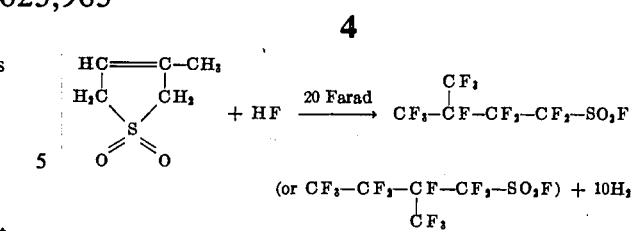

According to the $^{19}F$ nuclear resonance spectrum the isomeric compounds are present in the molar ratio of 2:1. The yield of substance was 30.0 percent. The current yield was 22.0 percent.

EXAMPLE 4

1,000 g. of 3,4-dimethylsulpholene were dissolved in 91g. of anhydrous hydrofluoric acid and electrolyzed, without the addition of a salt to confer conductivity, at + 2° C. In total, 2,820 g. of sulpholene were added. The maximum sulpholene concentration was 10 percent. After 532 electrolysis hours at an average voltage of 5.6 v. and an average current strength of 57.8 a., 3,320 g. of perfluorinated sulphonyl fluoride were drawn off at the bottom of the cell. Gaschromatography and analysis showed that 44.7 percent of the reaction product consisted of perfluoralkylsulphonyl fluorides.

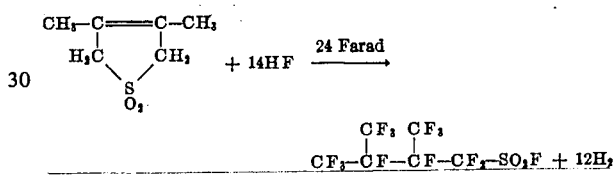

On electrofluorination of 3,4-dimethylsulpholene the homologues $C_5F_{11}SO_2F$ and $C_4F_9SO_2F$ which respectively have one and two perfluormethyl groups fewer were also produced alongside $C_6F_{13}SO_2F$.

We claim:
1. Process for the manufacture of perfluoralkylsulphonyl fluorides of general formula

$$R_FSO_2F$$

in which $R_F$ denotes a linear or branched perfluorocarbon residue having at least four C atoms, by electrochemical fluorination in anhydrous hydrofluoric acid, characterized in that cyclic unsaturated sulphones of general formula

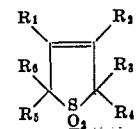

in which $R_1$, $R_2$, $R_3$, $R_4$, $R_5$ and $R_6$ independently of one another denote hydrogen or a C–$C_8$ alkyl group, are electrolyzed in anhydrous hydrofluoric acid.

* * * * *

UNITED STATES PATENT OFFICE
CERTIFICATE OF CORRECTION

Patent No. 3,623,963      Dated Nov. 30, 1971

Inventor(s) Peter Voss et al.

It is certified that error appears in the above-identified patent and that said Letters Patent are hereby corrected as shown below:

| COLUMN | LINE | ERROR |
|---|---|---|
| 1 | 40 | "$C_4H_9SO_2cl$" should be ---$C_4H_9-SO_2Cl$--- |
| 1 | 52 | "colling" should be ---cooling--- |
| 2 | 45 | "a./dm$^2$" should be ---A/dm$^2$--- |
| 2 | 57 | "9.61" should be ---9.6 1--- |
| 2 | 61 | "a./cm$^2$" should be ---A/cm$^2$--- |
| 2 | 63 | "81g" should be ---8 1 --- |
| 3 | 1 | "$C_4F_9SOF$" should be ---$C_4F_9SO_2F$--- |
| 3 | 12 | "9.61" should be ---9.6 1--- |
| 3 | 48 | "81g." should be ---8 1 --- |
| 4 | 3 | "+HF" should be ---+12 HF--- |
| 4 | 16 | "91g" should be --- 9 1 --- |
| 4 | 22 | "a." should be ---A--- |
| 4 | 56 | "$C-C_6$" should be ---$C_1-C_6$--- |

Signed and sealed this 1st day of August 1972.

(SEAL)
Attest:

EDWARD M. FLETCHER, JR.
Attesting Officer

ROBERT GOTTSCHALK
Commissioner of Patents